(12) United States Patent
Liao et al.

(10) Patent No.: US 7,857,456 B2
(45) Date of Patent: Dec. 28, 2010

(54) ILLUMINATION SYSTEM

(75) Inventors: Long-Sheng Liao, Hsinchu (TW); Yu-Po Chen, Hsinchu (TW); Keng-Han Chuang, Hsinchu (TW); Bo-Cheng Huang, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 762 days.

(21) Appl. No.: 11/833,724

(22) Filed: Aug. 3, 2007

(65) Prior Publication Data

US 2008/0252854 A1 Oct. 16, 2008

(30) Foreign Application Priority Data

Apr. 16, 2007 (TW) .............................. 96113307 A

(51) Int. Cl.
G03B 21/20 (2006.01)

(52) U.S. Cl. .......................................... 353/31; 353/81

(58) Field of Classification Search .................... 353/29, 353/30, 31, 81
See application file for complete search history.

(56) References Cited

U.S. PATENT DOCUMENTS

| | | | | |
|---|---|---|---|---|
| 6,220,710 B1 * | 4/2001 | Raj et al. | ....................... | 353/20 |
| 6,310,673 B1 * | 10/2001 | Sharp | ......................... | 349/106 |
| 6,648,475 B1 * | 11/2003 | Roddy et al. | .................. | 353/31 |
| 6,736,514 B2 * | 5/2004 | Horvath et al. | ................ | 353/31 |
| 6,762,785 B2 * | 7/2004 | Roddy et al. | ................. | 347/239 |
| 6,769,772 B2 * | 8/2004 | Roddy et al. | .................. | 353/31 |
| 6,807,010 B2 * | 10/2004 | Kowarz | ....................... | 359/634 |
| 6,857,748 B2 * | 2/2005 | Roddy et al. | .................. | 353/31 |
| 6,863,402 B2 * | 3/2005 | Roddy et al. | .................. | 353/31 |
| 6,910,777 B2 * | 6/2005 | Ito | ............................... | 353/31 |
| 7,137,704 B2 * | 11/2006 | Okuyama et al. | ............. | 353/20 |
| 7,293,880 B2 * | 11/2007 | Sakata et al. | ................. | 353/94 |
| 7,364,305 B2 * | 4/2008 | Itoh | ............................ | 353/31 |
| 7,417,799 B2 * | 8/2008 | Roth | ......................... | 359/634 |
| 7,471,822 B2 * | 12/2008 | Roth et al. | ................... | 382/162 |
| 2001/0005319 A1 * | 6/2001 | Ohishi et al. | ................. | 362/555 |
| 2003/0214633 A1 * | 11/2003 | Roddy et al. | .................. | 353/31 |
| 2003/0234911 A1 * | 12/2003 | Horvath et al. | ................ | 353/31 |
| 2004/0070736 A1 * | 4/2004 | Roddy et al. | .................. | 353/31 |
| 2004/0119949 A1 * | 6/2004 | Ito | ............................... | 353/31 |
| 2004/0189948 A1 * | 9/2004 | Okuyama et al. | ............. | 353/20 |
| 2005/0134811 A1 | 6/2005 | Magarill et al. | | |
| 2005/0248733 A1 * | 11/2005 | Sakata et al. | ................. | 353/94 |
| 2008/0079872 A1 * | 4/2008 | Yamauchi et al. | ............. | 349/97 |
| 2008/0143967 A1 * | 6/2008 | Bierhuizen et al. | ........... | 353/20 |
| 2008/0252854 A1 * | 10/2008 | Liao et al. | ..................... | 353/31 |

* cited by examiner

*Primary Examiner*—John R Lee
(74) *Attorney, Agent, or Firm*—J.C. Patents

(57) ABSTRACT

An illumination system includes a light source module, a chromaticity-adjusting light source and a light-combining element. The light source module provides a first color light beam, a second color light beam and a third color light beam. The chromaticity-adjusting light source provides a chromaticity-adjusting light beam. The light-combining element is disposed on the transmission paths of the chromaticity-adjusting light beam and the color light beams provided by the light source module to combine the color light beams with the chromaticity-adjusting light beam into an illumination beam.

18 Claims, 6 Drawing Sheets

ILLUMINATION SYSTEM

CROSS-REFERENCE TO RELATED APPLICATION

This application claims the priority benefit of Taiwan application serial no. 96113307, filed on Apr. 16, 2007. All disclosure of the Taiwan application is incorporated herein by reference.

BACKGROUND OF THE INVENTION

1. Field of the Invention

The present invention generally relates to an illumination system, and more particularly, to an illumination system used for a projection apparatus.

2. Description of Related Art

Referring to FIG. 1, it is a diagram of a conventional illumination system 100 for a projection apparatus. The conventional illumination system 100 includes a red light emitting diode (red LED) 110R, a green light emitting diode (green LED) 110G, a blue light emitting diode (blue LED) 110B, two dichroic mirrors 120a and 120b, a lens array 130 and three collimators 140. The red LED 110R, the green LED 110G and the blue LED 110B respectively emit a red light beam 112R, a green light beam 112G and a blue light beam 112B. The collimators 140 are respectively disposed in fronts of the light-emitting surfaces of the red LED 110R, the green LED 110G and the blue LED 110B so as to converge the light into the red light beam 112R, the green light beam 112G and the blue light beam 112B.

The dichroic mirror 120a is disposed on the transmission paths of the blue light beam 112B and the red light beam 112R, and the dichroic mirror 120a passes through the blue light beam 112B and reflects the red light beam 112R. The dichroic mirror 120b is disposed between the dichroic mirror 120a and the lens array 130 and located on the transmission paths of the blue light beam 112B, the red light beam 112R and the green light beam 112G. The dichroic mirror 120b passes through the blue light beam 112B and the red light beam 112R and reflects the green light beam 112G. In addition, the lens array 130 is for converging the red light beam 112R, the green light beam 112G and the blue light beam 112B.

Usually, a projection apparatus employing only one light valve sequentially projects a red image, a blue image and a green image onto a screen, and the three color images are superposed into a full-color image on the screen, therefore, the red LED 110R, the green LED 110G and the blue LED 110B are alternately emitted. However, such a scheme would make the conventional illumination system 100 providing a weaker light beam, which leads to a lower image luminance on the screen.

The following table 1 gives out the image luminance generated by the red LED 110R, the green LED 110G and the blue LED 110B on the screen and the coordinate points (x, y) corresponding to the red light, the green light, the blue light and the white light on a CIE1931 chromaticity diagram, which stands for the chromaticity diagram created by the International Commission on Illumination in 1931.

TABLE 1

| luminous power of the LED | | | image color and luminance on the screen | | | |
|---|---|---|---|---|---|---|
| red light | green light | blue light | color | x | y | luminance |
| 100% | 0% | 0% | red | 0.707 | 0.291 | 38 |
| 0% | 100% | 0% | green | 0.301 | 0.692 | 211 |
| 0% | 0% | 100% | blue | 0.140 | 0.040 | 21 |
| 100% | 100% | 100% | white | 0.267 | 0.281 | 270 |

Referring to FIG. 2, in general speaking, a natural light source is not a light source with a single wavelength. For example, when a natural light is red one, the light also contains other color light, such as green light and blue light, although the other color light occupies a weaker component than the dominant red light. Accordingly, the coordinate points corresponding to a natural light are located within a triangle 50 formed by three connection points of coordinate points R1, G1 and B1 on the CIE1931 chromaticity diagram. However, the conventional illumination system 100 employs LED light sources to provide red light, green light and blue light, wherein the LED light sources are single wavelength light sources which are corresponding to the coordinate points R2, G2 and B2 on the CIE1931 chromaticity diagram, respectively. The coordinate points R2, G2 and B2 are beyond the triangle 50, and the three connection lines thereof form a triangle 60 with a greater area than the area of the triangle 50. Thus, images on the screen by using the conventional illumination system 100 has excessive color saturation, which makes the image look less natural.

SUMMARY OF THE INVENTION

Accordingly, the present invention is related to an illumination system to improve image luminance and reduce excessive color saturation of an image.

As embodied and broadly described herein, the present invention provides an illumination system, which includes a light source module, a chromaticity-adjusting light source and a light-combining element. The light source module is to provide a first color light beam, a second color light beam and a third color light beam. The chromaticity-adjusting light source is to provide a chromaticity-adjusting light beam. The light-combining element is disposed on the transmission paths of the color light beams provided by the light source module and the chromaticity-adjusting light beam, so as to combine the color light beams provided by the light source module with the chromaticity-adjusting light beam into an illumination beam.

All of the first color light beam, the second color light beam and the third color light beam provided by the illumination system of the present invention are blended with the chromaticity-adjusting light beam. In this way, the illumination system of the present invention is advantageous in not only advancing image luminance, but also reducing excessive color saturation, so that the image looks more natural and vivid.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
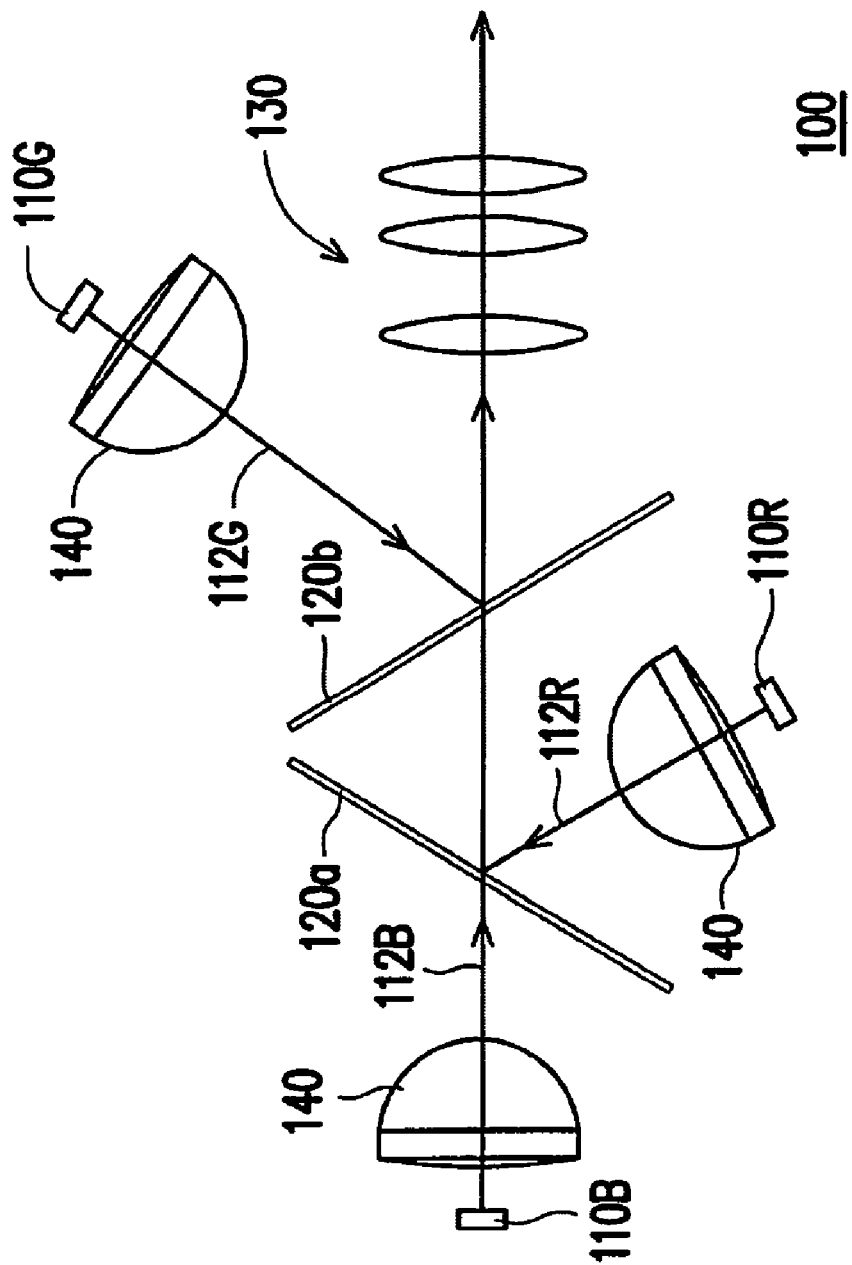
FIG. 1 is a schematic diagram of a conventional illumination system.
Figure 2:
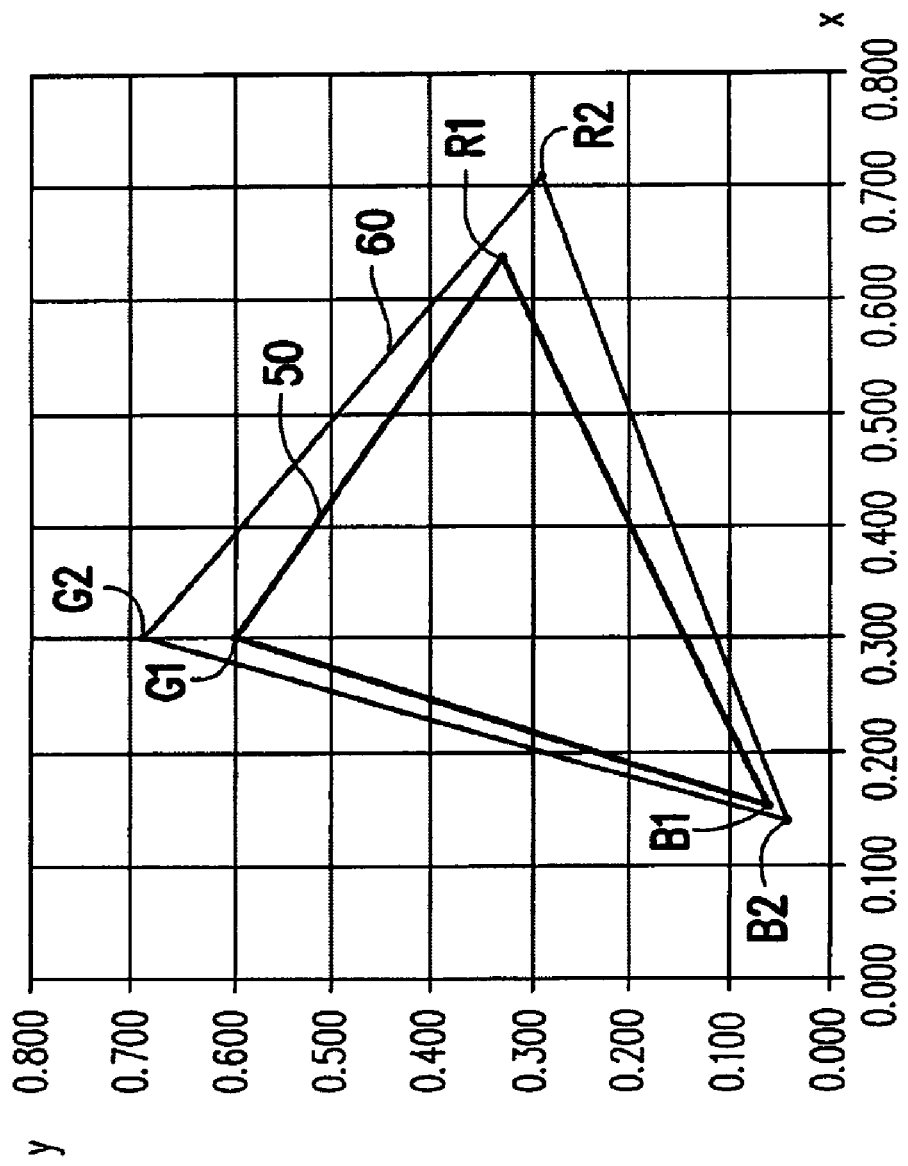
FIG. 2 is a CIE1931 chromaticity diagram with coordinate points corresponding to lights provided by the conventional illumination system.
Figure 3:
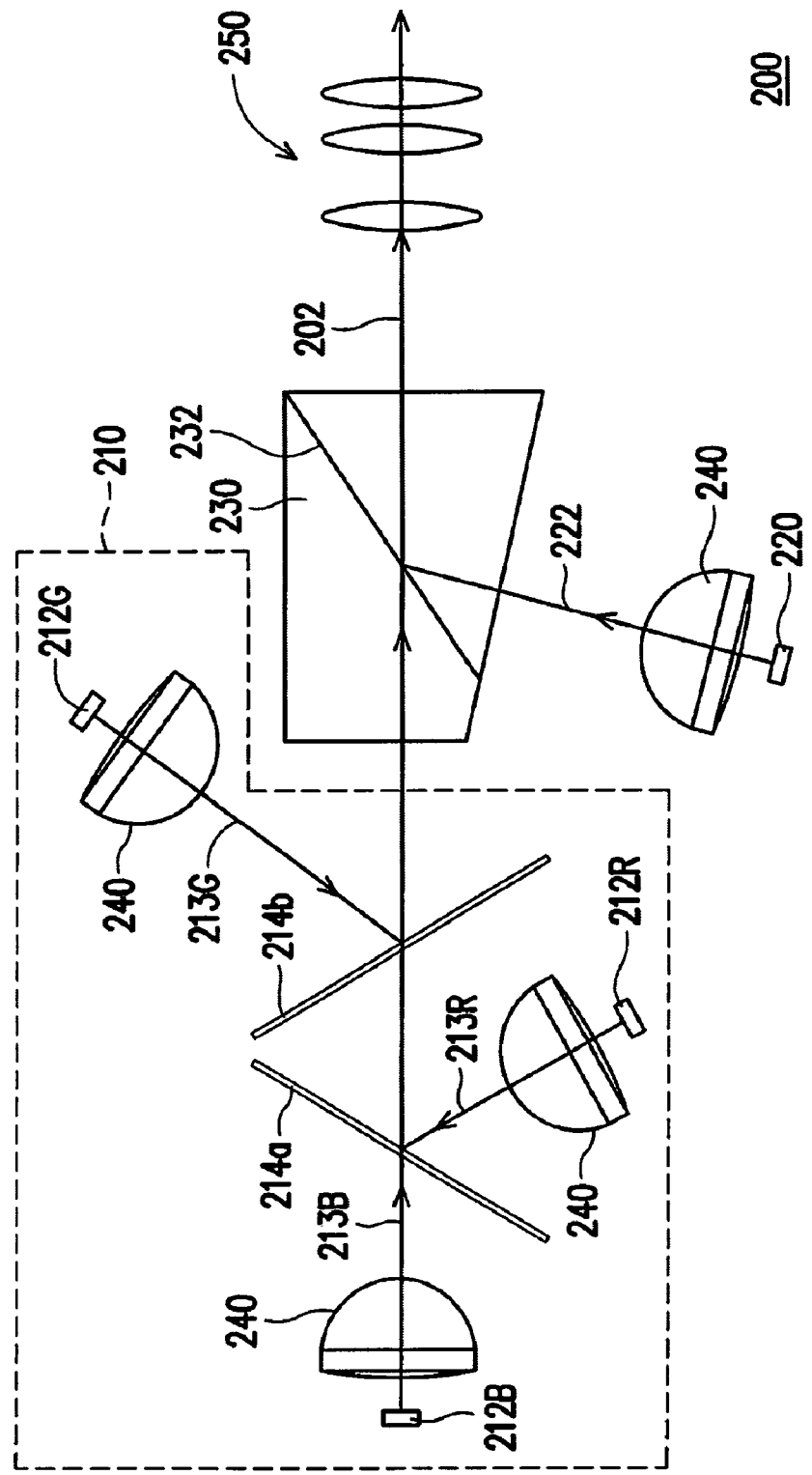
FIG. 3 is a schematic diagram of an illumination system according to an embodiment of the present invention.

Referring to FIG. 3, the illumination system 200 according to an embodiment of the present invention is used for a projection apparatus. The illumination system 200 includes a light source module 210, a chromaticity-adjusting light source 220 and a light-combining element 230. The light source module 210 is for providing a first color light beam 213B, a second color light beam 213R and a third color light beam 213G, and the chromaticity-adjusting light source 220 is for providing a chromaticity-adjusting light beam 222. The light-combining element 230 is disposed on the transmission paths of the light beams provided by the light source module 210 (i.e., the first color light beam 213B, the second color light beam 213R and the third color light beam 213G) and the chromaticity-adjusting light beam 222, so as to combine the light beams 213B, 213R and 213G provided by the light source module 210 with the chromaticity-adjusting light beam 222 into an illumination beam 202.

The above-mentioned light-combining element 230 is, for example, a total internal reflection prism (TIR prism) having a total reflection surface 232. The light-combining element 230 is disposed in such an orientation that the light beams 213B, 213R and 213G provided by the light source module 210 is able to pass through the total reflection surface 232 and the total reflection surface 232 is able to reflect the chromaticity-adjusting light beam 222 for combining with the light beams 213B, 213R and 213G provided by the light source module 210 into the illumination beam 202.

In the present embodiment, the light source module 210 can include a first color light source 212B for providing the first color light beam 213B, a second color light source 212R for providing the second color light beam 213R, a third color light source 212G for providing the third color light beam 213G, a first dichroic mirror 214a and a second dichroic mirror 214b. The first dichroic mirror 214a is disposed on the transmission paths of the first color light beam 213B and the second color light beam 213R, wherein the first color light beam 213B is able to pass through the first dichroic mirror 214a, and then transmitting to the second dichroic mirror 214b, while the second color light beam 213R is reflected by the first dichroic mirror 214a to the second dichroic mirror 214b. In addition, the second dichroic mirror 214b is disposed between the first dichroic mirror 214a and the light-combining element 230 and located on the transmission paths of the first color light beam 213B, the second color light beam 213R and the third color light beam 213G. The first color light beam 213B and the second color light beam 213R are able to pass the second dichroic mirror 214b, and then transmitting to the light-combining element 230.

The first color light source 212B, the second color light source 212R, the third color light source 212G and the light-combining element 230 can be LEDs, lasers or other appropriate light sources. Besides, the first color light source 212B, the second color light source 212R and the third color light source 212G can respectively be, but not limited to, one of red light source, blue light source and green light source. The color of the light-combining element 230 is depending on the requirements.

Figure 5:
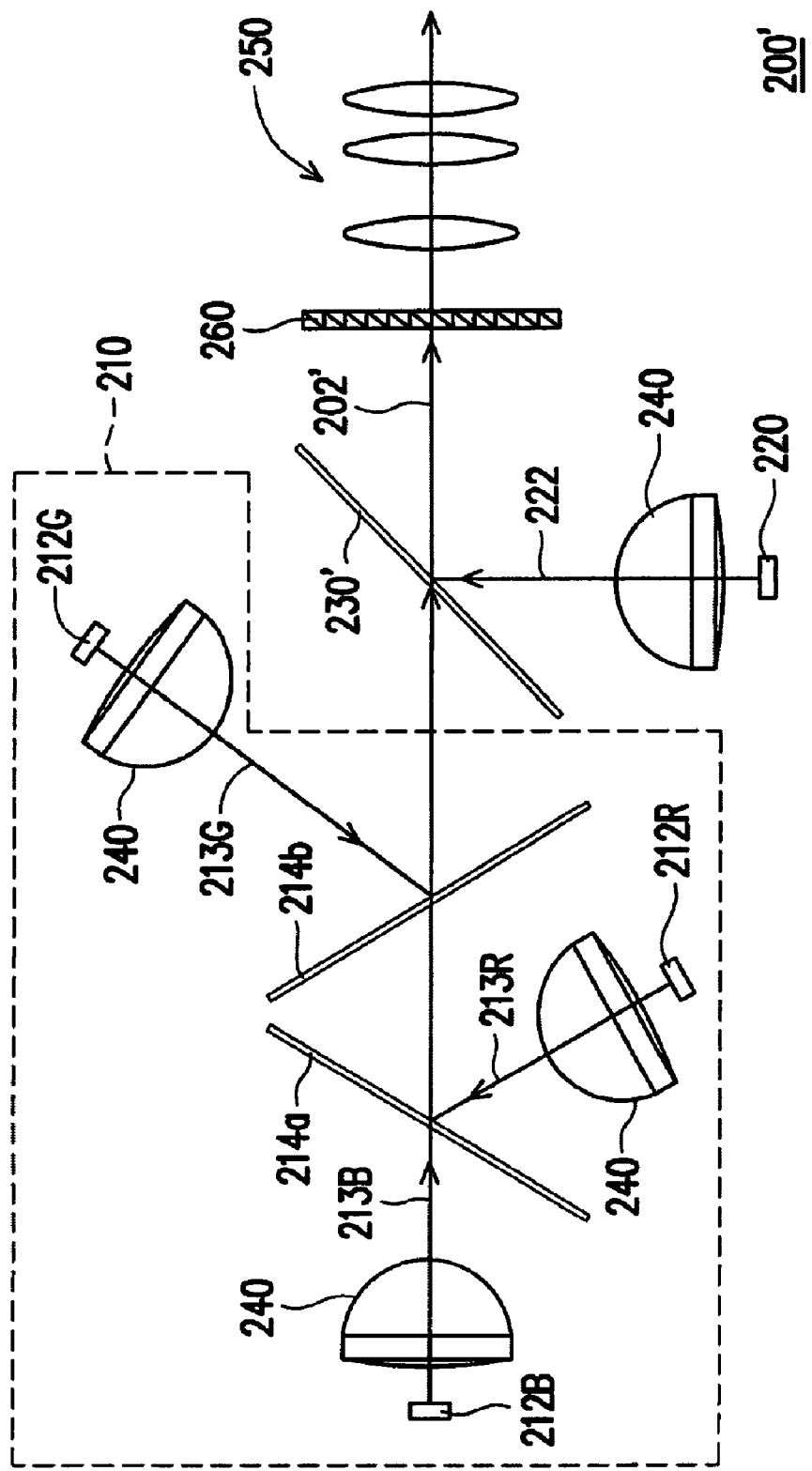
FIG. 5 is a schematic diagram of an illumination system according to another embodiment of the present invention.

In the present embodiment, light-converging elements 240 can be respectively disposed in fronts of light-emitting surfaces of the first color light source 212B, the second color light source 212R, the third color light source 212G and the light-combining element 230, and the light-converging elements 240 are, for example, collimators. In addition, a light-collecting unit 250 can be disposed on the transmission path of the illumination beam 202 for converging the illumination beam 202. The light-collecting unit 250 can be a light integration rod, a lens array (for example, a fly's eye lens) or a combination of the light integration rod and the lens array, and the light-collecting unit 250 in FIG. 5 is exemplarily a lens array.

In the following, the first color light source 212B, the second color light source 212R, the third color light source 212G and the chromaticity-adjusting light source 220 are exemplarily a red light source, a blue light source, a green light source and a white light source, respectively.

During the operation of the illumination system 200, the first color light source 212B, the second color light source 212R and the third color light source 212G, for example, emit light alternately, while the chromaticity-adjusting light source 220 stays lightening. Thus, when the first color light source 212B emits light, the illumination beam 202 is blended by blue light and white light. When the second color light source 212R emits light, the illumination beam 202 is blended by red light and white light. When the third color light source 212G emits light, the illumination beam 202 is blended by green light and white light. In this way, colors of the illumination beam 202 provided by the illumination system 200 can be close to the color of the natural light.

The luminous power of the chromaticity-adjusting light source 220 is adjustable depending on requirements. In other words, in response to lightening durations of different color light sources, the luminous power of the chromaticity-adjusting light source 220 can be different from each other.

The following table 2 gives out the image luminance generated by the first color light source 212B, the second color light source 212R, the third color light source 212G and the chromaticity-adjusting light source 220 on a screen and the coordinate points (x, y) corresponding to the red light, the green light, the blue light and the white light on a CIE1931 chromaticity diagram, wherein the first color light source 212B, the second color light source 212R, the third color light source 212G and the chromaticity-adjusting light source 220 are, for example, LEDs. Note that the data listed in table 2 are not to limit the present invention, and anyone skilled in the art should be able to modify the given parameters or settings after referring to the disclosures of the present invention, which still fall in the scope of the present invention.

TABLE 2

| luminous power of the LED | | | | image color and luminance on the screen | | | |
|---|---|---|---|---|---|---|---|
| red light | green light | blue light | white light | color | x | y | luminance |
| 100% | 0% | 0% | 4% | red light | 0.667 | 0.292 | 41.6 |
| 0% | 100% | 0% | 20% | green light | 0.296 | 0.621 | 229 |
| 0% | 0% | 100% | 20% | blue light | 0.154 | 0.066 | 39 |
| 100% | 100% | 100% | 100% | white light | 0.267 | 0.281 | 360 |

Figure 4:
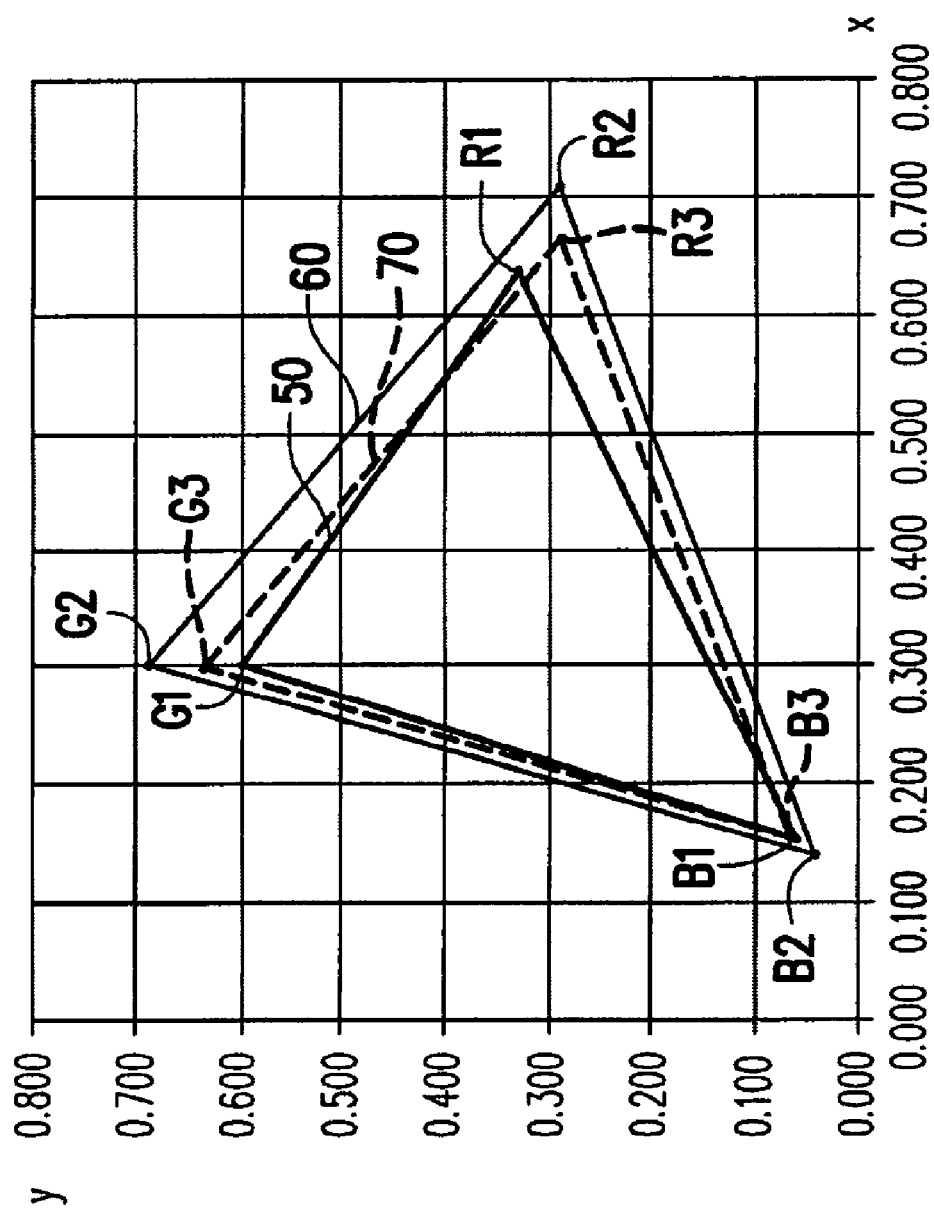
FIG. 4 is a CIE1931 chromaticity diagram with coordinate points corresponding to the lights provided by an illumination system according to an embodiment of the present invention.

Referring to table 2 and FIG. 4, since the red light, green light and the blue light provided by the illumination system 200 of the embodiment are respectively blended with white light, the coordinate points R3, G3 and B3 corresponding to the red light, the green light and the blue light on the CIE1931 chromaticity diagram are more close to the coordinate points R1, G1 and B1, respectively, which make an image look more natural. In addition, the area of the triangle 70 formed by the connection lines of the coordinate points R3, G3 and B3 is less than the area of the triangle 60 formed by the connection lines of the coordinate points R2, G2 and B2 in the prior art. Accordingly, the excessive saturation of an image in the prior art is reduced. Comparing table 2 with table 1, it can be seen that the image luminance in the present invention is advanced, since the red light, the green light and the blue light provided by the illumination system 200 of the embodiment are blended with white light.

Although the chromaticity-adjusting light source 220 in the above-described embodiment is a white color light source, but the chromaticity-adjusting light source 220 can be other color light sources as well depending on requirements.

Referring to FIG. 5, an illumination system 200' herein is similar to the illumination system 200 in FIG. 3 in terms of the architecture and the advantages thereof, except for some structure feature differences which are described hereinafter. The light-combining element 230' of the illumination system 200' is a polarization beam splitter (PBS), which passes through a first polarized light and reflects a second polarized light. In this way, the light beams provided by the light source module 210 are combined with the chromaticity-adjusting light beam 222 into an illumination beam 202'. The above-mentioned first polarized light and the second polarized light are respectively, for example, one of S-polarized light and P-polarized light.

When the illumination system 200' is used in, for example, a liquid crystal on silicon (LCOS) projection apparatus, an additional polarization conversion system (PCS) 260 can be disposed on the transmission path of the illumination beam 202' so as to convert the illumination beam 202' into a first polarized light or a second polarized light.

Figure 6:
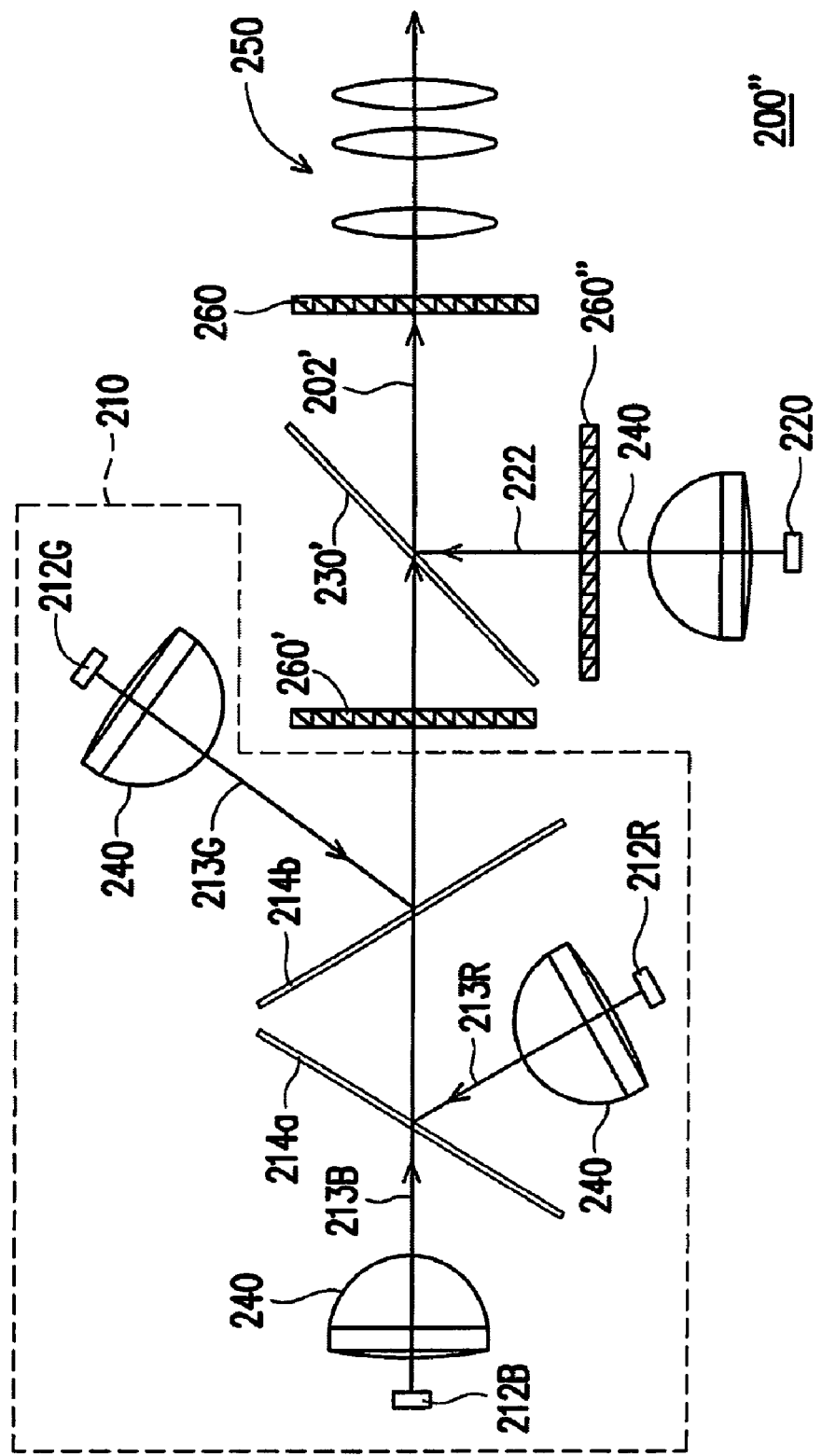
FIG. 6 is a schematic diagram of an illumination system according to another yet embodiment of the present invention.

Besides referring to FIG. 6, in an illumination system 200" of another yet embodiment, in order to advance the luminance of the illumination beam 202', an additional PCS 260' is disposed between the light source module 210 and the light-combining element 230' to convert the light beams provided by the light source module 210 into first polarized light beams. Moreover, a PCS 260" can be disposed between the chromaticity-adjusting light source 220 and the light-combining element 230' to convert the chromaticity-adjusting light beam 222 provided by the chromaticity-adjusting light source 220 into a second polarized light beam. The PCS 260' disposed between the light-combining element 230' and the light source module 210 and the PCS 260" disposed between the light-combining element 230' and the chromaticity-adjusting light source 220 can be respectively replaced by a polarizer.

In summary, since the chromaticity-adjusting light beam provided by the chromaticity-adjusting light source of the present invention is combined with the first color light beam, the second color light beam and the third color light beam into the illumination beam, the luminance of the illumination beam is advanced and the color of the illumination beam is more close to the natural light. In short, the present invention is advantageous in not only increasing image luminance, but also reducing excessive saturation of an image and making the image look more natural.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, used for a projection apparatus, comprising:
    a light source module, for providing a first color light beam, a second color light beam and a third color light beam;
    a chromaticity-adjusting light source, for providing a chromaticity-adjusting light beam; and
    a light-combining element, disposed on transmission paths of the color light beams provided by the light source module and the chromaticity-adjusting light beam to combine the color light beams provided by the light source module with the chromaticity-adjusting light beam into an illumination beam, wherein the chromaticity-adjusting light beam and each of the color light beams respectively originate in different light sources.

2. The illumination system according to claim 1, wherein the chromaticity-adjusting light source comprises a laser or a light emitting diode.

3. The illumination system according to claim 1, wherein the chromaticity-adjusting light source is a white light source.

4. The illumination system according to claim 1, wherein the light source module comprises:
    a first color light source, for providing the first color light beam;
    a second color light source, for providing the second color light beam;
    a third color light source, for providing the third color light beam;
    a first dichroic mirror, disposed on the transmission paths of the first color light beam and the second color light beam, wherein the first dichroic mirror passes through the first color light beam and reflects the second color light beam; and
    a second dichroic minor, disposed between the first dichroic mirror and the light-combining element and located on the transmission paths of the first color light beam, the second color light beam and the third color light beam, wherein the second dichroic minor passes through the first color light beam and the second color light beam and reflects the third color light beam.

5. The illumination system according to claim 4, wherein the first color light source, the second color light source and the third color light source comprise light emitting diodes or lasers.

6. The illumination system according to claim 4, wherein the first color light source, the second color light source and the third color light source are respectively one of red light source, blue light source and green light source.

7. The illumination system according to claim 4, further comprising a plurality of light-converging elements disposed respectively in fronts of light-emitting surfaces of the first color light source, the second color light source and the third color light source.

8. The illumination system according to claim 1, further comprising a light-converging element disposed in front of a light-emitting surface of the chromaticity-adjusting light source.

9. The illumination system according to claim 1, wherein the light-combining element comprises a total internal reflection prism.

10. The illumination system according to claim 1, wherein the light-combining element comprises a polarization beam splitter.

11. The illumination system according to claim 10, further comprising a polarization conversion system, wherein the light-combining element is disposed between the polarization conversion system and the light source module.

12. The illumination system according to claim 10, further comprising a polarization conversion system disposed between the light source module and the light-combining element.

13. The illumination system according to claim 10, further comprising a polarization conversion system disposed between the light source module and the chromaticity-adjusting light source.

14. The illumination system according to claim 10, further comprising a polarizer disposed between the light source module and the light-combining element.

15. The illumination system according to claim 10, further comprising a polarizer disposed between the light source module and the chromaticity-adjusting light source.

16. The illumination system according to claim 1, further comprising a light-collecting unit disposed on a transmission path of the illumination beam.

17. The illumination system according to claim 16, wherein the light-collecting unit comprises a light integration rod, a lens array, or a combination of the light integration rod and the lens array.

18. The illumination system according to claim 16, wherein the light-collecting unit is a fly's eye lens.

* * * * *